(12) United States Patent
Neil et al.

(10) Patent No.: US 10,021,630 B2
(45) Date of Patent: Jul. 10, 2018

(54) METHOD AND APPARATUS FOR PROVIDING ACCESS TO A PACKET DATA NETWORK

(71) Applicant: ip.access Limited, Cambourne (GB)

(72) Inventors: David Neil, Cambridge (GB); Neil Philip Piercy, Royston (GB)

(73) Assignee: IP.ACCESS LIMITED, Cambourne, Cambridgeshire (GB)

( * ) Notice: Subject to any disclaimer, the term of this patent is extended or adjusted under 35 U.S.C. 154(b) by 0 days.

(21) Appl. No.: 15/040,607

(22) Filed: Feb. 10, 2016

(65) Prior Publication Data

US 2016/0165526 A1 Jun. 9, 2016

Related U.S. Application Data

(63) Continuation of application No. 13/129,972, filed as application No. PCT/EP2009/008094 on Nov. 13, 2009, now abandoned.

(30) Foreign Application Priority Data

Nov. 18, 2008 (GB) .................................. 0821047.8

(51) Int. Cl.
*H04W 48/16* (2009.01)
*H04W 88/08* (2009.01)
(Continued)

(52) U.S. Cl.
CPC ......... *H04W 48/16* (2013.01); *H04L 61/2038* (2013.01); *H04L 61/3015* (2013.01);
(Continued)

(58) Field of Classification Search
None
See application file for complete search history.

(56) References Cited

U.S. PATENT DOCUMENTS

2004/0184425 A1   9/2004  Lai
2006/0272009 A1  11/2006  Stott
(Continued)

FOREIGN PATENT DOCUMENTS

EP    1098539    5/2001
GB    2417856    3/2006

OTHER PUBLICATIONS

3GPP Technical Specification 24.008; 3rd Generation Partnership Project; Technical Specification Group Core Network and Terminals; Mobile Radio Interlace Layer 3 Specification; Core Network Protocols; Stage 3; (Release 9); V9.3.0; Jun. 2010; http://www.3gpp.org.

(Continued)

*Primary Examiner* — Christopher Crutchfield
*Assistant Examiner* — Tito Pham
(74) *Attorney, Agent, or Firm* — Fitch, Even, Tabin & Flannery LLP

(57) ABSTRACT

An access point supports communication in a femto cell of a cellular communication network. The access point comprises transceiver circuitry arranged to enable communication with at least one wireless communication unit located within the femto cell, and a signal processing logic module comprising an access point controller interface logic module arranged to enable communication between the access point and an access point controller. The signal processing logic module further comprises a gateway logic module arranged to provide an interface between the at least one wireless communication unit located within the femto cell and a packet data network.

16 Claims, 7 Drawing Sheets

(51) Int. Cl.
*H04L 29/12* (2006.01)
*H04W 40/02* (2009.01)
*H04W 92/12* (2009.01)

(52) U.S. Cl.
CPC .......... *H04W 40/02* (2013.01); *H04W 88/08* (2013.01); *H04W 92/12* (2013.01)

(56) References Cited

U.S. PATENT DOCUMENTS

| | | | |
|---|---|---|---|
| 2007/0213057 A1* | 9/2007 | Shaheen | H04W 76/041 455/436 |
| 2008/0076425 A1 | 3/2008 | Khetawat et al. | |
| 2008/0165740 A1 | 7/2008 | Bachmann et al. | |
| 2008/0285492 A1* | 11/2008 | Vesterinen | H04W 4/001 370/310 |
| 2009/0156213 A1 | 6/2009 | Spinelli et al. | |
| 2009/0303943 A1* | 12/2009 | Vikberg | H04L 63/10 370/329 |
| 2010/0027533 A1* | 2/2010 | Kant | H04L 45/00 370/355 |
| 2010/0094943 A1* | 4/2010 | Leuca | G06Q 10/107 709/206 |
| 2010/0333173 A1* | 12/2010 | Barriga | H04L 9/0844 726/2 |
| 2011/0164504 A1* | 7/2011 | Bothos | H04L 47/125 370/237 |

OTHER PUBLICATIONS

3GPP TR 23.919, 3rd Generation Partnership Project; Technical Specification Group Services Aspects; Direct Tunnel Deployment Guideline; (Release 9); V9.0.0; Dec. 2009; http://www.3gpp.org.

3GPP TS 23.060, 3rd Generation Partnership Project; Technical Specification Group Services and System Aspects; General Packet Radio Service (GPRS); Service Description; Stage 2; (Release 1999); V3.5.0, Oct. 2000, http://www.3gpp.org.

3rd Generation Partnership Project; Technical Specification Group Services and System Aspects; 3GPP System to Wireless Local Area Network (WLAN) Interworking (Release 6) 3GPPTS23.234, V6.003-2004; http://www.3gpp.org.

International Search Report and Written Opinion for PCT/EP2009/08094 dated Apr. 1, 2010.

* cited by examiner

METHOD AND APPARATUS FOR PROVIDING ACCESS TO A PACKET DATA NETWORK

RELATED APPLICATION(S)

This is a continuation of U.S. patent application Ser. No. 13/129,972, Filed Nov. 15, 2011, entitled METHOD AND APPARATUS FOR PROVIDING ACCESS TO A PACKET DATA NETWORK, which application is a national phase application of International Application No. PCT/EP2009/08094, Filed Nov. 13, 2009, claiming priority to Great Britain Application No. 0821047.8, all of which are incorporated by reference in their entirety herein.

FIELD OF THE INVENTION

The field of the invention relates to a method and apparatus for providing access to a packet data network, and in particular, to providing such access to a wireless communication unit operating within a femto cell of a cellular communication network.

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS), developed by the $3^{rd}$ Generation Partnership Project (3GPP) (www.3gpp.org). The $3^{rd}$ generation of wireless communications has generally been developed to support macro-cell mobile phone communications. Such macro cells utilise high power base stations (Node Bs in 3GPP parlance) to communicate with wireless Communication units within a relatively large coverage area. Typically, wireless communication units, or User Equipment (UE) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem comprising one or more cells to which UEs may attach, and thereby connect to the network. Each macro-cellular RNS further comprises a controller, in the form of a Radio Network Controller (RNC), operably coupled to the one or more Node Bs, via an Iub interface.

The RNC is operably coupled to a Serving GPRS (General Packet Radio Service Support Node (SGSN) within the core network via an Iu interface. The SGSN is operably coupled to a Gateway GPRS Support Node (GGSN), also located within the core network, via a Gn interface. The GGSN provides an interface Gi between the backbone GPRS network and external packet data networks, such as the Internet.

In order for a UE to access, say, the Internet via the 3G wireless communication system, the UE must activate a PDP (Packet Data Protocol) context. A PDP context is a data structure present on both the current SGSN for that UE, and a GGSN that provides access to the required external packet data network, which for this example comprises the Internet.

To activate a PDP context, the UE selects an Access Point Name (APN) corresponding to the required external packet data network, (e.g. the Internet). The selection of the APN may be based on configuration information or by user input. The UE then sends a GPRS session management message in the form of an Activate PDP Context Request message comprising the APN to the SGSN. Further details for GPRS management messages may be found in 3GPP Technical Specification 24.008.

Upon receipt of the Activate PDP Context Request message, the SGSN performs DNS (Domain Name Server) lookup for the APN, in order to locate the address of the appropriate GGSN. The SGSN then initiates PDP context activation within itself and the appropriate GGSN, and sends details of the activated PDP context to the UE. The UE is then able to access, for example, the Internet using the activated PDP context within the GGSN.

Lower power (and therefore smaller coverage area) femto cells (or pico-cells) are a recent development within the field of wireless cellular communication systems. Femto cells or pico-cells (with the term femto cells being used hereafter to encompass pico-cells or similar) are effectively communication coverage areas supported by low power base stations (otherwise referred to as Access Points (APs)). These femto cells are intended to be able to be piggy-backed onto the more widely used macro-cellular network and support communications to UEs in a restricted, for example 'in-building', environment.

In this regard, a femto cell that is intended to support communications according to the 3GPP standard will hereinafter be referred to as a 3G femto cell. Similarly, an access controller intended to support communications with a low power base station in a femto cell according to the 3GPP standard will hereinafter be referred to as a $3^{rd}$ generation access controller (3G AC). Similarly, an Access Point intended to support communications in a femto cell according to the 3GPP standard will hereinafter be referred to as a $3^{rd}$ Generation Access Point (3G AP).

Typical applications for such 3G APs include, by way of example, residential and commercial (e.g. office) locations, 'hotspots', etc, whereby an AP can be connected to a core network via, for example, the Internet using a broadband connection or the like. In this manner, femto cells can be provided in a simple, scalable deployment in specific in-building locations where, for example, network congestion at the macro-cell level may be problematic.

In a femto cell scenario, an RNS typically comprises multiple 3G Access Points (3G AP), performing a number of functions generally associated with a base station or Node B and a controller in a form of a 3G Access controller (3G AC). The 3G AP is typically coupled to the 3G Access Controller via the Internet. The 3G Access Controller is then typically coupled to the core network (CN) via an Iu interface. In this manner, the 3G AP is able to provide voice and data services to a cellular handset, such as UE, in a femto cell in contrast to the macro cell, in the same way as a conventional Node-B, but with the deployment simplicity of, for example, a Wireless Local Area Network (WLAN) access point.

Currently, in order for a UE within a femto cell to access, say, the Internet via the 3G wireless communication system, the UE must activate a PDP context within the SGSN and GGSN, and access the Internet (or other external packet data network) via the GGSN of the core network. Accordingly, data being uploaded from the UE to the Internet is sent via the 3G AP over the Internet to the 3G Access Controller, before being routed via the SGSN and GGSN back to the Internet. Similarly, data being downloaded from the Internet is routed via the GGSN and SGSN to the 3G Access Controller, where it is transmitted over the Internet to the 3G AP.

As will be appreciated by a skilled artisan, this current approach for accessing the Internet and other external packet data networks via femto cells is inefficient, since typically 3G APs already have substantially direct access to the Internet. Therefore, the current technique is wasteful of network resources that could otherwise be utilised more effectively.

SUMMARY OF THE INVENTION

Accordingly, the invention seeks to mitigate, alleviate or eliminate one or more of the abovementioned disadvantages singly or in any combination.

According to a first aspect of the invention, there is provided an access point for supporting communication in a femto cell of a cellular communication network. The access point comprises transceiver circuitry arranged to enable communication with at least one wireless communication unit located within the femto cell, and a signal processing logic module comprising access point controller interface logic module arranged to enable communication between the access point and an access point controller. The signal processing logic module further comprises a gateway logic module arranged to provide a gateway interface between the at least one wireless communication unit located within the femto cell and a packet data network. In this manner, the access point is able to provide the wireless communication unit with substantially direct access to the packet data network, without the need for such access to be routed through the core network. As a result, network resources do not need to be unnecessarily and wastefully used.

Optionally, upon receipt of a request from a wireless communication unit to access the packet data network, the signal processing logic module may be arranged to modify the request to comprise an identifier corresponding to the gateway logic module of the access point, and to forward the modified request on to a core network element via the access point controller. In this manner, the gateway logic module may be utilised with current wireless communication units.

According to a second aspect of the invention, there is provided a wireless communication unit comprising transceiver circuitry arranged to enable communication with a cellular communication network, and a signal processing logic module arranged to request access to a packet data network via the cellular communication network.

The signal processing logic module is further arranged to determine whether the wireless communication unit is connected to a femto cell access point of the cellular communication network, and if the wireless communication unit is connected to a femto cell access point of the cellular communication network, to transmit a request to access the packet data network comprising an identifier corresponding to a gateway interface of the femto cell access point.

According to a third aspect of the invention, there is provided a network element of a cellular communication network. The network element comprises a signal processing logic module arranged to receive requests to access a packet data network from wireless communication units and to initiate access activation in response thereto. The signal processing logic module comprises a gateway router logic module. Upon receipt of a request to access a packet data network from a wireless communication unit within a femto cell, the gateway router logic module is arranged to identify a femto access point supporting the femto cell within which the wireless communication unit is located, and obtain an address for a gateway interface of the identified femto access point with which the signal processing logic module is to initiate access activation.

According to a fourth aspect of the invention, there is provided a method for providing access to a packet data network. The method comprises receiving a request to access the data packet network at a femto access point, the request comprising an identifier corresponding to a remote gateway interface, modifying the request to comprise an identifier corresponding to a local gateway interface, and forwarding the modified request on to a core network element.

According to a fifth aspect of the invention, there is provided a method for providing a wireless communication unit with access to a packet data network. The method comprises determining whether the wireless communication unit is connected to a femto cell access point of a cellular communication network, and if the wireless communication unit is connected to a femto cell access point of the cellular communication network, to transmit a request to access the packet data network comprising an identifier corresponding to a gateway interface of the femto cell access point.

According to a sixth aspect of the invention, there is provided a method for providing access to a packet data network. The method comprises receiving a request to access the packet data network from a wireless communication unit within a femto cell, identifying a femto access point supporting the femto cell within which the wireless communication unit is located, obtaining an address for a gateway interface of the identified femto access point, and initiating access creation using the obtained femto access point gateway interface address. According to a seventh aspect of the invention, there is provided a wireless communication system adapted to support a method for providing access to a packet data network according to any one of the methods of the fourth, fifth, or sixth aspects of the invention.

According to an eighth aspect of the invention, there is provided a computer-readable storage element having computer-readable code stored thereon for programming a signal processing logic module in accordance with any of the aforementioned methods.

These and other aspects, features and advantages of the invention will be apparent from, and elucidated with reference to, the embodiments described hereinafter.

BRIEF DESCRIPTION OF THE DRAWINGS

Brief Description of the Drawings Embodiments of the invention will be described, by way of example only, with reference to the accompanying drawings, in which.

DETAILED DESCRIPTION OF EMBODIMENTS OF THE INVENTION

Figure 1:
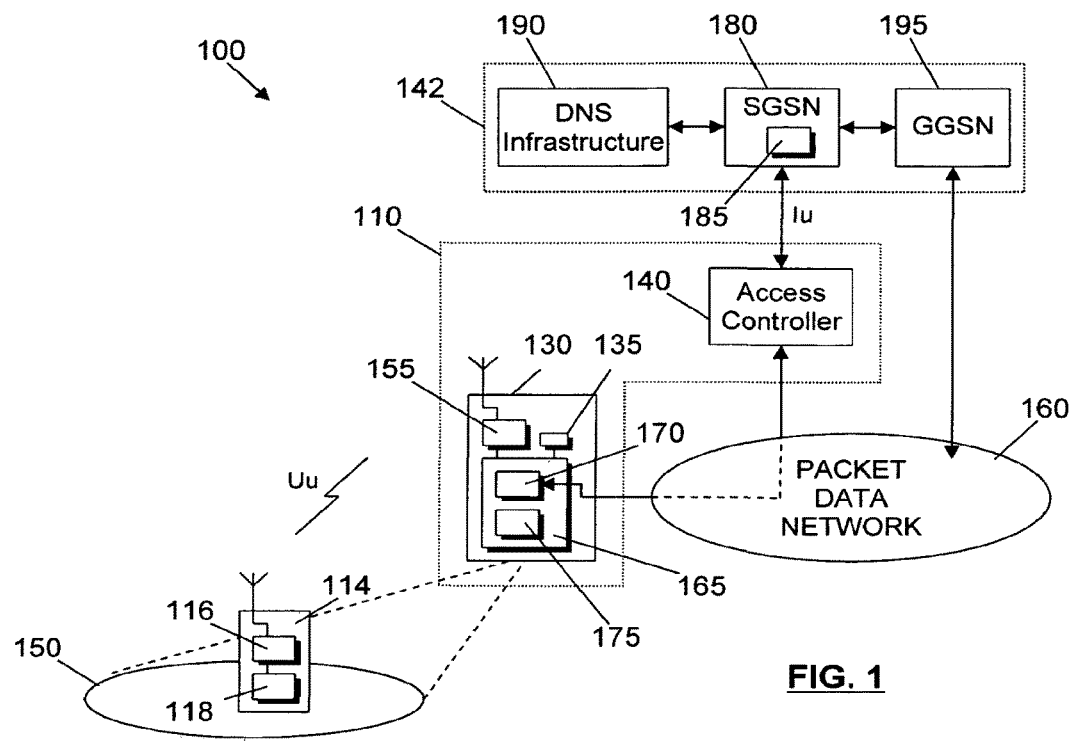
FIGS. 1 and 2 illustrate an example of part of a cellular communication network adapted in accordance with some embodiments of the invention.
Figure 2:
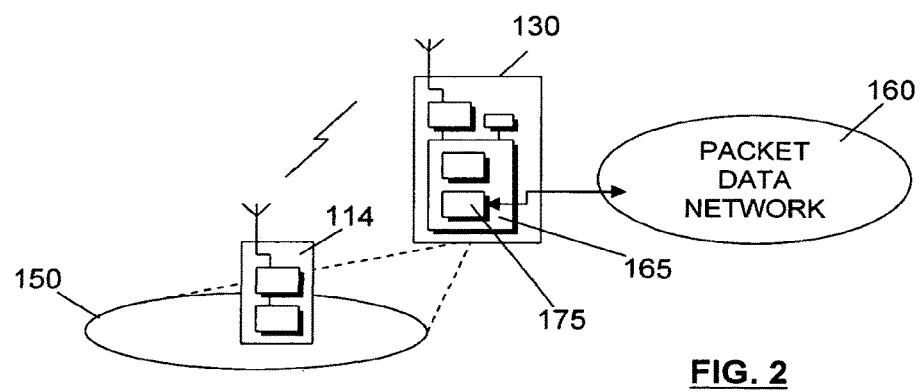

Referring now to the drawings, and in particular FIGS. 1 and 2, an example of part of a 3GPP network, adapted in accordance with an embodiment of the invention, is illustrated and indicated generally at 100. In particular, there is illustrated an example of part of a cellular communication network 100 that comprises a combination of macro cells (not shown) and 3G femto cells. For the embodiment illustrated in FIGS. 1 and 2, there is illustrated a radio network sub-system (RNS) 110 comprising an architecture adapted to handle femto cell communications.

In the illustrated femto cell scenario, the RNS 110 comprises a network element in a form of a 3G Access Point (3G AP) 130, performing a number of functions generally associated with a base station or Node B, and a controller in a form of a 3G Access controller (3G AC) 140. As will be appreciated by a skilled artisan, a 3G Access Point is a communication element that supports communications within a communication cell, such as a 3G femto cell 150, and as such provides access to the cellular communication network via the 3G femto cell 150. One envisaged application is that a 3G AP 130 may be purchased by a member of the public and installed in their home or office. The 3G AP 130 may then be connected to a 3G AC 140 over a packet data network 160, such as the Internet.

Thus, a 3G AP 130 may be considered as encompassing a scalable, multi-channel, two-way communication device that may be provided within, say, residential and commercial (e.g. office) locations, 'hotspots' etc, to extend or improve upon network coverage within those locations. Although there are no standard criteria for the functional components of a 3G AP, an example of a typical 3G AP for use within a 3GPP system may comprise some Node-B functionality and some aspects of a typical radio network controller (RNC) functionality within a macro cell architecture. For the illustrated embodiment, the 3G AP 130 further comprises transceiver circuitry 155 arranged to enable communication with one or more wireless communication units located within the general vicinity of the femto cell 150, such as User Equipment (UE) 114, via a wireless interface (Uu).

The 3G Access Controller 140 may be coupled to the core network (CN) 142 via an Iu interface, as shown. In this manner, the 3G AP 130 is able to provide voice and data services to a cellular handset, such as UE 114, in femto cell 150, in the same way as a conventional macro cell Node-B, but with the deployment simplicity of, for example, a Wireless Local Area Network (WLAN) access point.

For the illustrated embodiment, the UE 114 is a wireless communication unit comprising a transceiver 116 arranged to enable communication with a cellular communication network, and a signal processing logic module 118. As would be appreciated by a skilled person, UE 114 comprises numerous other functional and logical elements to support wireless communications and functionality, which will not be described further herein.

The 3G AP 130 of FIGS. 1 and 2 further comprises signal processing logic module 165.

The signal processing logic module 165 comprises access point controller interface logic module 170 arranged to enable communication between the 3G AP 130 and the 3G Access Controller 140. In particular, and as illustrated in FIG. 1, the access point controller logic module 170 is arranged to enable communication between the 3G AP 130 and the 3G Access Controller 140, for example via the packet data network 160.

As previously mentioned, current approaches for accessing external packet data networks via femto cells are inefficient, since such access is required to be routed via a Gateway GPRS (General Packet Radio Service) Support Node (GGSN) within the core network.

Accordingly, the signal processing logic module 165 of the 3G AP 130 illustrated in FIGS. 1 and 2 further comprises a gateway logic module 175 arranged to provide a gateway interface between wireless communication units within the femto cell 150, such as UE 114, and the packet data network 160. In this manner, and as illustrated in FIG. 2, the 3G AP 130 is able to provide UE 114 with substantially direct access to the packet data network 160, without the need for such access to be routed through the core network 142. For example, a One-tunnel', or 'Direct Tunnel' may be created directly between, say, an air interface controller (not shown) of the 3G AP 130 and the gateway logic 175. As a result, network resources do not need to be unnecessarily and wastefully used. In particular, and as described in greater detail below with reference to some embodiments of the invention, it is contemplated that the gateway logic 175 may be implemented as a GGSN interface within the cellular communication network 100. In this manner, when a wireless communication unit requests access to the packet data network 160, the gateway logic 175 may be allocated by the core network 142 as the GGSN via which such access is to be provided. In this manner, the provision of access to the external packet data network may be achieved whilst adhering to the 3GPP (and/or other) standards, and without resources within the core network 142 being unnecessarily reserved.

As defined in 3GPP TR 23.919, a Direct Tunnel (previously referred to as a One Tunnel approach) allows an SGSN to establish a direct user plane tunnel between a Radio Access Network (RAN) and a GGSN within the packet switched domain. In particular, for embodiments of the invention, a Direct Tunnel may be established between, say, an air interface controller (not shown) of the 3G AP 130 and the gateway logic 175. The SGSN may handle the control plane signalling and make the decision when to establish a Direct Tunnel. In case of a Direct Tunnel, the SGSN provides the RAN with the TEID (Tunnel Endpoint IDentifier) and user plane address of the RAN. The detail procedures for establishing a Direct Tunnel are specified in 3GPP TS 23.060.

It is further contemplated that, in the case where a femto access point, such as the 3G AP 130 of FIGS. 1 and 2, is deployed within, say, a corporate environment comprising a Local Area Network (LAN), such as a corporate intranet, the femto access point according to embodiments of the present invention may provide a further benefit of enabling wireless communication units connected thereto to access the LAN.

As will be appreciated by a skilled artisan, the access point controller logic module 170 and the gateway logic module 175 may be arranged to utilise a common physical connection to the packet data network 160, along with some common layers within a protocol stack therefor. For example, both the access point controller logic module 170 and the gateway logic module 175 may utilise the Internet Protocol Suite TCP/IP (Transport Control Protocol/Internet Protocol), for the transmission of data packets to and from the packet data network 160.

In accordance with some embodiment of the invention, upon receipt of a request from a wireless communication unit to access the packet data network 160, the signal processing logic module 165 may be arranged to modify the request to comprise an identifier corresponding to the gateway logic module 175 of the 3G AP 130, and to forward the modified request on to a core network element, such as Serving GPRS Support Node (SGSN) 180, via the 3G access controller 140. In this manner, the gateway logic module 175 may be utilised with current wireless communication units. For example, upon receipt of a request from a wireless communication unit to access the packet data network 160, the signal processing logic module 165 may be arranged to modify the request to comprise an address corresponding to the gateway logic module 175 of the 3G AP 130. Alternatively, upon receipt of a request from a wireless communication unit to access the packet data network 160, the signal processing logic module 165 may be arranged to modify the request to comprise a substantially generic address corresponding to gateway logic modules of access points.

Furthermore, upon receipt of a request to access a data packet network, the signal processing logic module 165 of the 3G AP 130 may be arranged to determine whether the data packet network, for which access is requested, is the same data packet network 160 with which the gateway logic module 175 of the 3G AP 130 is arranged to provide an interface. If the data packet network, for which access is requested, is the same data packet network 160 with which the gateway logic module 175 is arranged to provide an interface, the signal processing logic module 165 may then be arranged to modify the request to comprise an identifier corresponding to the gateway logic module 175. The signal processing logic module 165 may then forward the modified request on to a core network element via the 3G access controller 140. Otherwise, if the data packet network for which access is requested is not the same data packet network 160 with which the gateway logic module 175 is arranged to provide an interface, the signal processing logic module 165 may forward the unmodified request on to the core network element.

In a traditional 3G cellular communication system, in order for a wireless communication units to access an external packet data network such as the Internet via the cellular communication network, the wireless communication unit is required to activate a PDP (Packet Data Protocol) context. A PDP context is a data structure present on both a SGSN (Serving GPRS Support Node) for the cell within which the wireless communication unit is located, and a GGSN within the core network via which access to the required external packet data network is available.

To activate a PDP context, the wireless communication unit selects an Access Point Name (APN) that corresponds to the required external packet data network. The selection of the APN may be based on, for example, pre-stored configuration information or on user input. The wireless communication unit then sends an Activate PDP Context Request message comprising the APN to the SGSN. Upon receipt of the Activate PDP Context Request message, the SGSN performs a DNS (Domain Name Server) lookup for the APN to locate an address for the appropriate GGSN. The SGSN then sends a Create PDP Context Request message to the appropriate GGSN. Upon receipt of a Create PDP Context Response message from the GGSN, confirming that a PDP Context has been created, the SGSN sends an Activate PDP Context Accept message to the wireless communication unit. The wireless communication unit is then able to access the external packet data network using the activated PDP context within the GGSN.

Referring back to FIGS. 1 and 2, and in accordance with an embodiment of the invention, when a wireless communication unit located within the femto cell 150, for example UE 114, wants to access the external data packet network 160, the UE 114 sends a request to access the packet data network to the core network 142, via the 3G AP 130. Upon receipt of such a request, the signal processing logic module 165 of the 3G AP 130 may be arranged to modify the request to comprise an identifier corresponding to the gateway logic module of the access point, and to forward the modified request on to the core network 142 via the 3G controller 140.

For example, in accordance with an embodiment of the invention, the request may be in a form of an Activate PDP Context Request message. Typically, an Activate PDP Context Request message comprises an Access Point Name (APN) information element. An APN information element identifies the packet data network to which the wireless communication unit wishes to connect. In particular, within a GPRS backbone, an APN provides a reference to a GGSN. To support inter-PLMN (Public Land Mobile Network) roaming, the internal GPRS DNS functionality is used to translate the APN into an IP (Internet Protocol) address for the GGSN. An APN comprises one or more labels separated by dots, such as for example:

service.operator.com where 'service' may comprise a value of 'web', 'wap', 'email', etc., and 'operator' may comprise the name of the network operator to which the wireless communication unit is subscribed (e.g. Vodaphone™, 02™, T-Mobile™, Orange™, Virgin™, etc.). The APN can be resolved, for example using DNS functionality, to provide an IP address of an appropriate GGSN for accessing the required service.

As previously mentioned for the embodiment illustrated in FIGS. 1 and 2, upon receipt of such a request, the signal processing logic module 165 of the 3G AP 130 may be arranged to modify the request to comprise an identifier corresponding to the gateway logic module 175 of the 3G AP 130. For example, in the case were such a request is in a form of an Activate PDP Context Request message, the signal processing logic module 165 may be arranged, upon receipt of an Activate PDP Context Request message from a wireless communication unit, to determine whether the received Activate PDP Context Request message comprises an APN corresponding to a service (e.g. web, wap, email) relating to the data packet network 160 with which the gateway logic module 175 of the 3G AP 130 is arranged to provide an interface.

For example, the 3G AP 130 may be configured with, say, a list of APN labels (for example comprising complete APNs, service labels, etc.) that relate to the packet data network 160 with which the gateway logic module 175 of the 3G AP 130 is arranged to provide an interface, whereby said list may be stored in a memory element 135 of the 3G AP 130. Accordingly, the signal processing logic module 165 may be arranged, upon receipt of an Activate PDP Context Request message from a wireless communication unit, to retrieve the list of APN labels from memory. The signal processing logic module may then compare the APN within the received Activate PDP Context Request message, to entries within the list to determine whether the received Activate PDP Context Request message comprises an APN corresponding to a service relating to the data packet network 160 with which the gateway logic module 175 of the 3G AP 130 is arranged to provide an interface.

If the received Activate PDP Context Request message does comprise an APN corresponding to a service relating to the data packet network 160, with which the gateway logic module 175 is arranged to provide an interface, the signal processing logic module 165 may be arranged to modify the Activate PDP Context Request message to comprise an APN corresponding to the gateway logic module of the 3G AP 130. The signal processing logic module 165 may then forward the modified request on to a core network element via the access point controller. An example of a modified APN may comprise:

service.femto.operator.com where the APN is modified to include a generic label 'femto', indicating that the required access point for the external packet data network is located within a femto AP. An alternative example of a modified APN may comprise:

service.<apserial>.femto.operator.com where the APN is further modified to include the <sup>x</sup><apserial>' label, as well as the generic 'femto' label. In this manner, not only does the modified APN indicate that a required access point for the external packet data network is located within a femto AP, but also provides a serial number for the specific femto AP.

However, if the received Activate PDP Context Request message does not comprise an APN corresponding to a service relating to the data packet network 160 with which the gateway logic module 175 is arranged to provide an interface, the signal processing logic module 165 may forward the unmodified request on to a core network element via the access point controller.

The forwarded request is received by a core network element, which for the illustrated embodiment is in a form of SGSN 180. Upon receipt of the Activate PDP Context Request message, The SGSN 180 provides the APN contained therein to a DNS infrastructure 190, which performs a DNS lookup to retrieve an IP address for the required GGSN, such as core network GGSN 195. However, in the case where the 3G AP 130 has modified the Activate PDP Context Request message to comprise an APN corresponding to the gateway logic module 175 of the 3G AP 130, the DNS infrastructure 190 returns an IP address corresponding to the gateway logic module 175 of the 3G AP 130.

As will be appreciated, an SGSN may be responsible for serving a large number of femto cell access points. Furthermore, femto cell populations may tend to be more dynamic, with new femto cells continuously being added, and some older femto cells sometimes being removed from the network. Consequently, it may not be practical for the DNS Infrastructure 190 to store IP addresses for a gateway logic module within each femto cell access point. Thus, and in accordance with an embodiment of the invention, the SGSN 180 may comprise a femto gateway router logic module 185. In this manner, upon receipt of a modified Activate PDP Context Request message, the DNS infrastructure 190 recognises that the APN corresponds to a gateway logic module of a femto access point, and returns, say, the IP address of the femto gateway router logic module 185. Upon receipt of the IP address of the femto gateway router logic module 185, the SGSN 180 forwards the request to activate a PDP context to the femto gateway router logic module 185, for example in a form of a Create PDP Context Request message. The femto gateway router logic module 185 then identifies the specific femto cell AP, within which the required gateway logic is located, and sends a Create PDP Context Request message to that femto cell AP gateway logic module.

By way of example, the Create PDP Context Request message may comprise an IMSI (International Mobile Subscriber Identity) for the wireless communication unit requesting access to the packet data network 160. The gateway router logic 185 may comprise, or have access to, a database or other storage facility (not shown) associating IMSIs with 3G APs, such as 3G AP 130. For example, upon deployment and configuration of a 3G AP, IMSIs of wireless communication units authorised to access services through that 3G AP are stored within the database or other storage facility and associated with the corresponding 3G AP. Upon receipt of a Create PDP Context Request message, the gateway router logic 185 is thereby able to identify the appropriate 3G AP from the IMSI therein, and to send the Create PDP Context Request message to the gateway logic module 175 for that 3G AP.

Upon receipt of the Create PDP Context Request message, the gateway logic module 175 of the 3G AP 130 creates a PDP Context, and sends back a Create PDP Context Response to the SGSN 180. Upon receipt of the Create PDP Context Response message from the gateway logic module 175 of the 3G AP 130, the SGSN 180 sends an Activate PDP Context Accept message to the wireless communication unit 114. The wireless communication unit may then proceed with accessing the external packet data network 160 via the gateway logic module 175 of the 3G AP 130.

Figure 3:
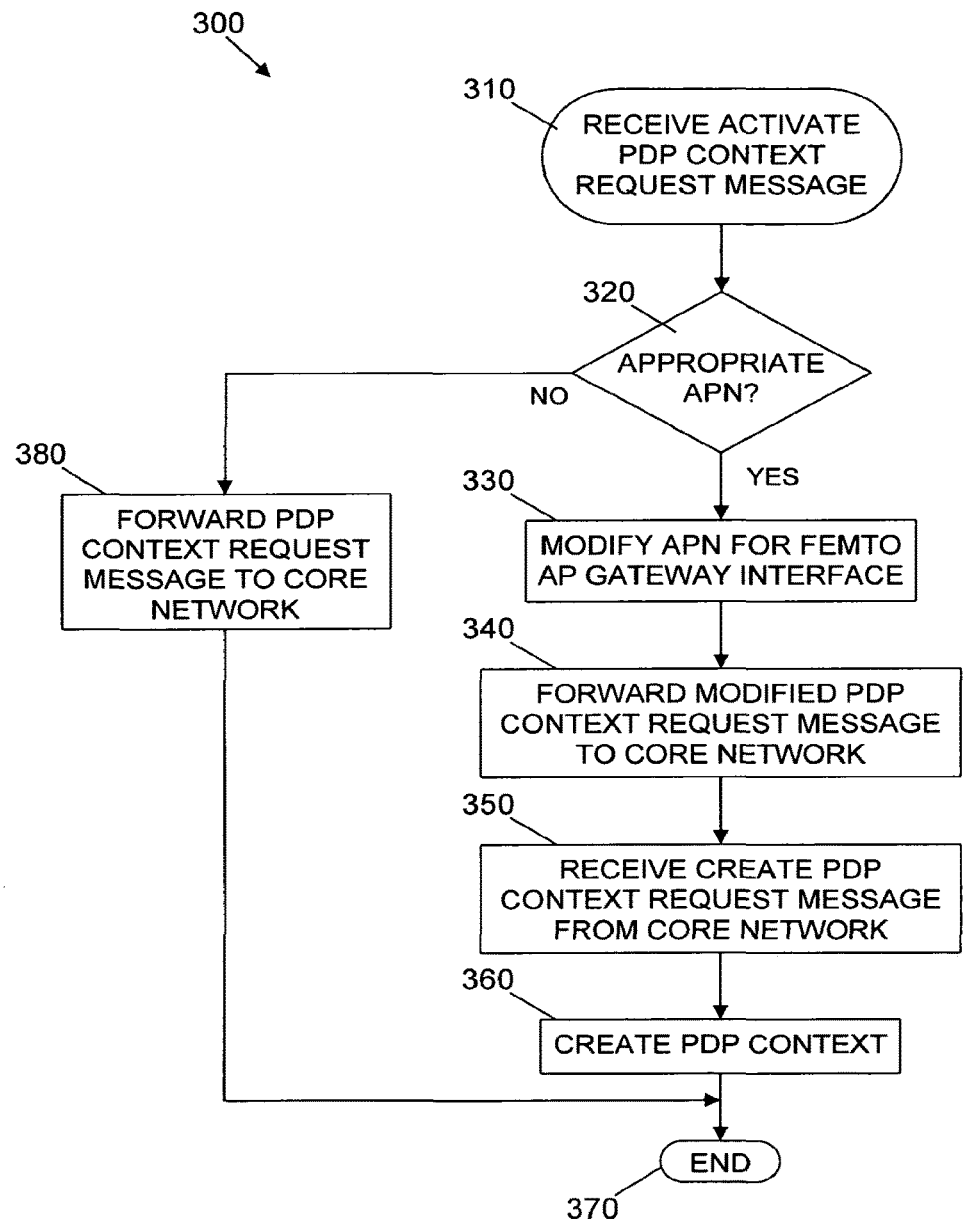
FIG. 3 illustrates an example of a simplified flowchart of a method for providing access to a packet data network according to an embodiment of the invention.

Referring now to FIG. 3 there is illustrated an example of a simplified flowchart 300 of a method for providing access to a packet data network, according to an embodiment of the invention. The method starts at step 310 with the receipt of a request to access a packet data network from a wireless communication unit, which for the illustrated embodiment is in a form of an Activate PDP Context Request message. Next, in step 320, it is determined whether the request comprises an identifier that corresponds to a packet data network for which a local interface is available. For example, it may be determined whether the request comprises an APN corresponding to a service relating to the data packet network with which a gateway logic module of a local access point is arranged to provide an interface.

If it is determined that the request comprises an identifier corresponding to a packet data network for which a local gateway interface is available, the method moves on to step 330, where the request is modified to comprise an identifier corresponding to the local gateway interface. For example, the APN of the Activate PDP Context Request message may be modified to indicate a femto gateway interface. Next, in step 340, the modified request is forwarded to a core network element, such as an SGSN. A request to create a PDP context, for example in a form of a Create PDP Context Request message, is then received from the core network, in step 350, following which a PDP context is created at the local gateway interface in step 360. The method then ends at step 370. Referring back to step 320, if it is determined that the request does not comprise an identifier that corresponds to a packet data network for which a local gateway interface is available, the method moves on to step 380, where the unmodified request is forwarded to a core network element, for example an SGSN, and the method ends at step 370.

Referring back to FIGS. 1 and 2, for the previously described embodiment of the invention, the signal processing logic module 165 of the 3G AP 130 is arranged, upon receipt of a request from a wireless communication unit to access the packet data network 160, to modify the request to comprise an identifier corresponding to the gateway logic module 175 of the 3G AP 130, and to forward the modified request on to the SGSN 180 via the 3G access controller 140.

In this manner, access to the packet data network 160 may be routed via the more local gateway logic module 175.

However, in accordance with an alternative embodiment, a wireless communication unit, such as UE 114, may be arranged to transmit a request to access the packet data network 160 comprising an identifier corresponding to the gateway logic module 175 of the 3G AP 130. For example, the UE 114 may comprise signal processing logic module 118 arranged to request access to a packet data network via the cellular communication network 100. The signal processing logic module 118 may be further arranged to determine whether the UE 114 is connected to a femto cell access point. For example, femto cells may be configured with specific 'femto' Location Area Codes (LACs). Accordingly, the signal processing logic module 118 of the UE 114 may be arranged to identify when it is connected to a cell comprising such a 'femto' LAC. Alternatively, the UE may be configured to recognise one or more 'home' femto cells, such as femto cells deployed within the residence and/or work place of the user of the UE 114.

If the UE 114 is connected to a femto cell access point, such as the 3G AP 130, the signal processing logic module 118 may be arranged to transmit a request to access the packet data network 160 comprising an identifier, such as an address, corresponding to a gateway interface of the femto cell access point, such as the gateway logic module 175 of the 3G AP 130. Alternatively, the signal processing logic module 118 may be arranged to transmit a request to access the packet data network comprising a substantially generic address corresponding to gateway logic modules of access points. For example, the signal processing logic module 118 may transmit an Activate PDP Context Request message comprising an APN such as:

service.femto.operator.com

In this manner, the 3G AP 130 may be arranged to simply forward the received request on to the SGSN 180. Upon receipt of the request, the SGSN provides the APN to the DNS infrastructure 190, which returns an IP address for the appropriate gateway. For example, in the case where the signal processing logic module 118 of the UE 114 transmitted a request comprising an identifier that corresponds to a gateway logic module 175 of the 3G AP 130, the DNS infrastructure returns an IP address for the femto gateway router logic module 185. Consequently, a Create PDP Context Request message is transmitted back to the gateway logic module 175 of the 3G AP 130.

Figure 4:
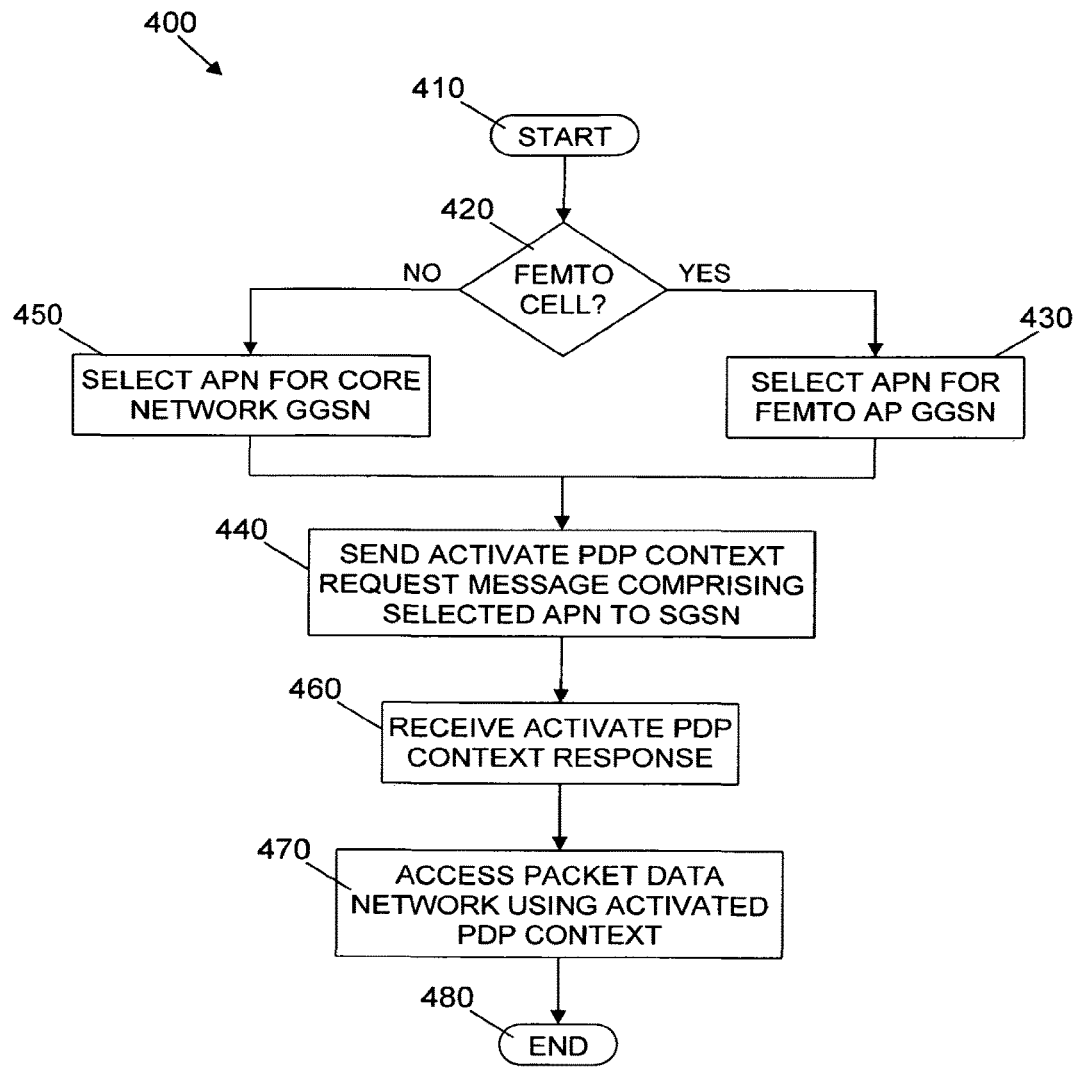
FIG. 4 illustrates an example of a simplified flowchart of a method for providing a wireless communication unit with access to a packet data network according to an alternative embodiment of the invention.

Referring now to FIG. 4, there is illustrated an example of a simplified flowchart 400 of a method for providing a wireless communication unit with access to a packet data network according to an alternative embodiment of the invention. The method starts at step 410, for example when the wireless communication unit needs to access a packet data network. The method then moves to step 420, where it is determined whether the wireless communication unit is connected to a femto cell access point of a cellular communication network. For example, femto cells may be configured with specific 'femto' Location Area Codes (LACs). Accordingly, the signal processing logic module 118 of the wireless communication unit may be arranged to identify when it is connected to a cell comprising such a 'femto' LAC. Alternatively, the wireless communication unit may be configured to recognise one or more 'home' femto cells by way of their Cell Identifiers, such as femto cells deployed within the residence and/or work place of the user of the wireless communication unit. If it is determined that the wireless communication unit is connected to a femto cell access point, the method moves on to step 430 where an identifier, for example an APN, corresponding to a gateway interface of the femto cell access point is selected. A request to access the packet data network, such as an Activate PDP Context Request message, that comprises the selected identifier is then sent to a core network element such as an SGSN in step 440.

Referring back to step 420, if it is determined that the wireless communication unit is not connected to a femto cell access point, the method moves on to step 450, where an identifier corresponding to a core network gateway (e.g. GGSN) is selected. A request to access the packet data network, such as an Activate PDP Context Request message, comprising the selected identifier is then transmitted to a core network element such as an SGSN in step 440.

Having sent the request comprising the selected identifier to the core network element, the method moves on to step 460, where a response to the request is received, for example in a form of an Activate PDP Context Response message. The packet data network may then be accessed using the activated PDP context in step 470. The method then ends at step 480.

Figure 5:
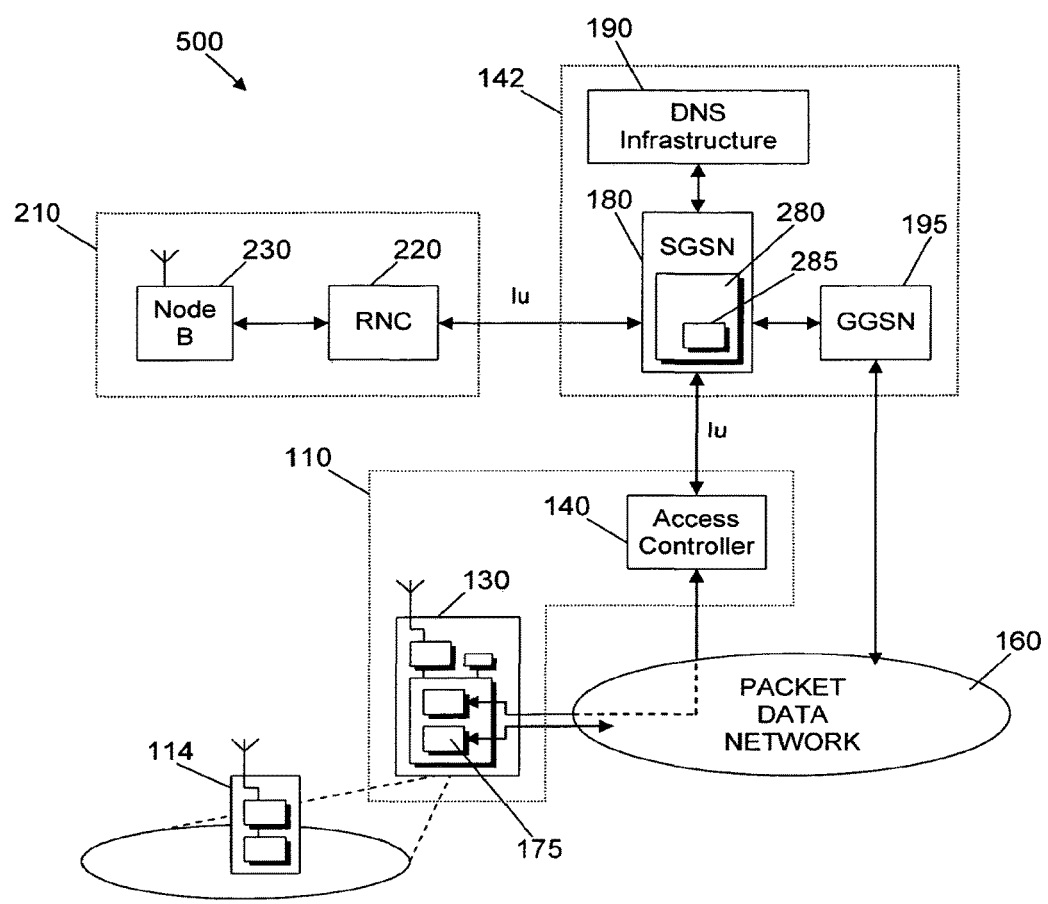
FIG. 5 illustrates an example of part of the cellular communication network of FIGS. 1 and 2 adapted in accordance with an alternative embodiment of the invention.

Referring now to FIG. 5, there is illustrated an example of part of the 3GPP network 500, adapted in accordance with an alternative embodiment of the invention. In particular, there is illustrated an example of part of a cellular communication network 500 that comprises a combination of macro cells and femto cells.

As previously mentioned, for the femto cell scenario the RNS 110 comprises a 3G AP 130 coupled to 3G access controller 140 via packet data network 160. The 3G access controller 140 is coupled to the core network 142 via an Iu interface, as shown. The core network 142 comprises network elements in a form of SGSN 180, DNS infrastructure 190 and GGSN 195.

The core network 142 is further coupled to a macro radio network sub-system 210 comprising one or more Radio Network Controllers (RNCs) 220 and one or more macro cell base station transceivers, or Node Bs in 3G parlance, 230. The one or more RNCs 220 within the macro radio network sub-system 210 are also coupled to the SGSN 180 via an Iu interface.

In accordance with an embodiment of the invention, the SGSN 180 comprises signal processing logic module 280 arranged to receive requests to access the packet data network 160 from wireless communication units and to initiate access creation in response thereto. In particular, the signal processing logic module 280 comprises gateway router logic module 285, and upon receipt of a request to access a packet data network from a wireless communication within a femto cell, such as UE 114, the gateway router logic module 285 is arranged to identify a femto access point that supports the femto cell within which the wireless communication unit is located. The gateway router logic module 285 is arranged to obtain an address for a gateway interface of the identified femto access point with which the signal processing logic module 280 is to initiate access activation. By way of example, the gateway router logic 285 may comprise, or have access to, a database or other storage facility (not shown) associating IMSIs with 3G APs, such as 3G AP 130. For example, upon deployment and configuration of a 3G AP, IMSIs of wireless communication units authorised to access services through that 3G AP are stored within the database or other storage facility and associated with the corresponding 3G AP. Upon receipt of a request to access a packet data network from a wireless communication, the gateway router logic 285 is thereby able to identify the appropriate 3G AP from the IMSI of the requesting wireless communication unit, and to send a Create PDP Context Request message to the gateway logic module for that 3G AP.

In particular, upon receipt of a request to access the packet data network 160, the signal processing logic module 280 of the SGSN 180 may be arranged to determine whether the request was received from the macro sub-system RNC 220 or the femto 3G access controller 140. If the request was received from the femto 3G access controller 140, the signal processing logic module 280 may be arranged to provide at least part of the request to the gateway router logic module 285, such that the gateway router logic module 285 is able to obtain an appropriate address for the gateway logic module 175 of the relevant 3G AP 130.

For example, the UE 114 may transmit a request to access the packet data network 160 in the form of an Activate PDP Context Request message. The 3G AP 130 receives the request from the UE 114, and forwards it on to the 3G access controller 140, which in turn forwards it on to the SGSN 180. Upon receipt of the request, the signal processing logic module 280 of the SGSN 180 identifies that the request was received from the femto 3G access controller 140, for example by identifying which access controller connection (Iu) was used to receive the request, and provides the request to the gateway router logic module 285. The gateway router logic module 285 identifies the femto access point from which the request was received, for example by way of an IMSI of the requesting wireless communication unit, and obtains an IP address for the gateway logic module 175 of the appropriate 3G AP 130. For example, having identified the relevant femto access point, the IP address for the corresponding gateway logic may be resolved using a DNS lookup type operation. The gateway router logic module 285 is then able to return the IP address for the gateway logic module 175 of the 3G AP 130 back to the signal processing logic module 280. The signal processing logic module 280 is then able to initiate activation of the PDP Context, for example by sending a Create PDP Context Request message to the gateway logic module 175 of the 3G AP 130.

Figure 6:
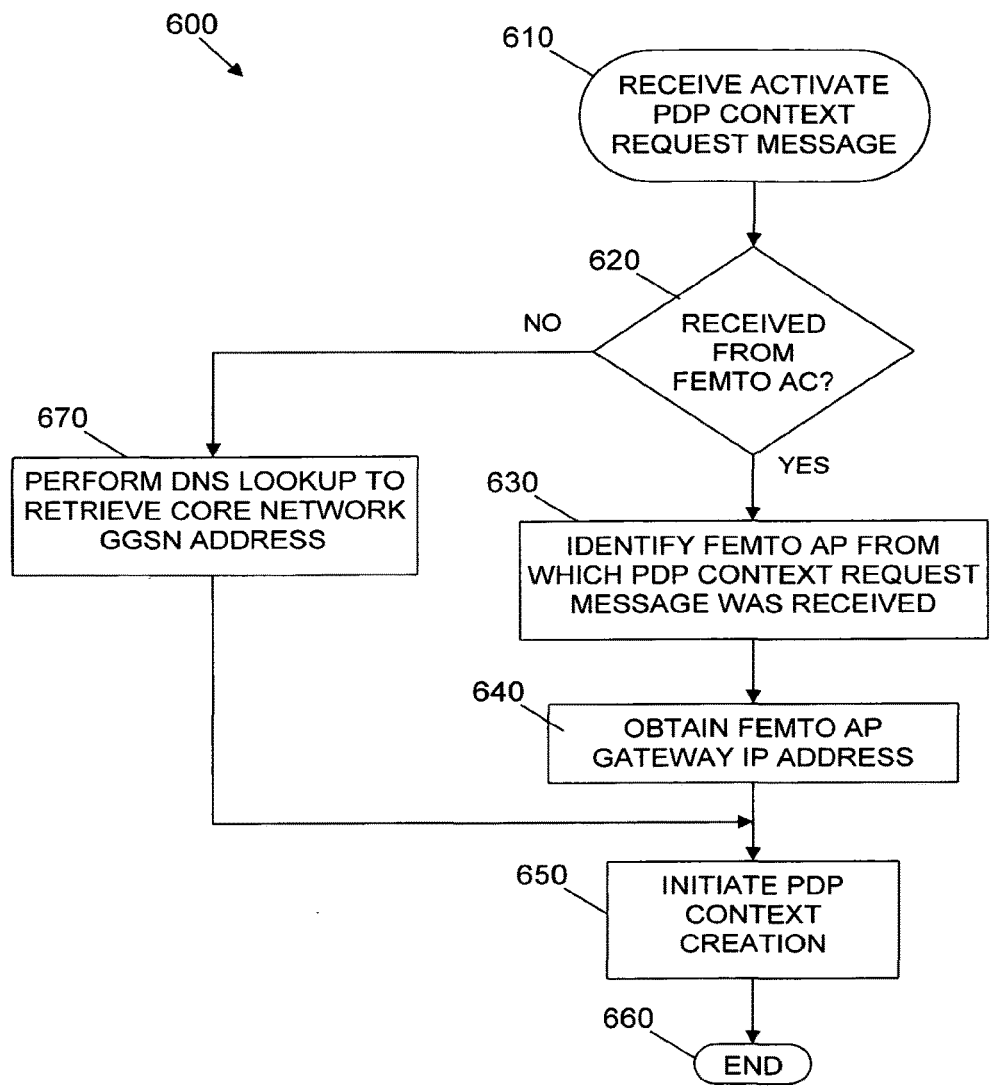
FIG. 6 illustrates an example of a simplified flowchart of a method for providing access to a packet data network according to an alternative embodiment of the invention.

FIG. 6 illustrates an example of a simplified flowchart 600 of a method for providing access to a packet data network according to an alternative embodiment of the invention.

The method starts at step 610, with the receipt of a request to access the packet data network from a wireless communication unit. For example, the request may be in a form of an Activate PDP Context Request message. Next, in step 620, it is determined whether the request came from a macro sub-system, for example via an RNC, or from a femto sub-system, for example via a femto access controller.

If it is determined that the request came from a femto sub-system, the method moves on to step 630, where the relevant femto access point supporting the femto cell, within which the wireless communication unit is located, is identified. The IP address for the gateway interface of the femto access point to the packet data network is then obtained, in step 640. Access creation is then initiated using the obtained femto access point gateway interface address in step 650, and the method ends in step 660. Referring back to step 620, if it is determined that the request did not come from a femto sub-system, but rather from a macro sub-system, the method moves to step 670, where a DNS lookup is performed on an identifier (e.g. an APN) within the received request in order to retrieve an IP address for a core network gateway interface, for example in the form of a GGSN. The method then moves on to step 650, where access creation is initiated using the retrieved core network gateway interface address in step 650, and the method ends in step 660.

Figure 7:
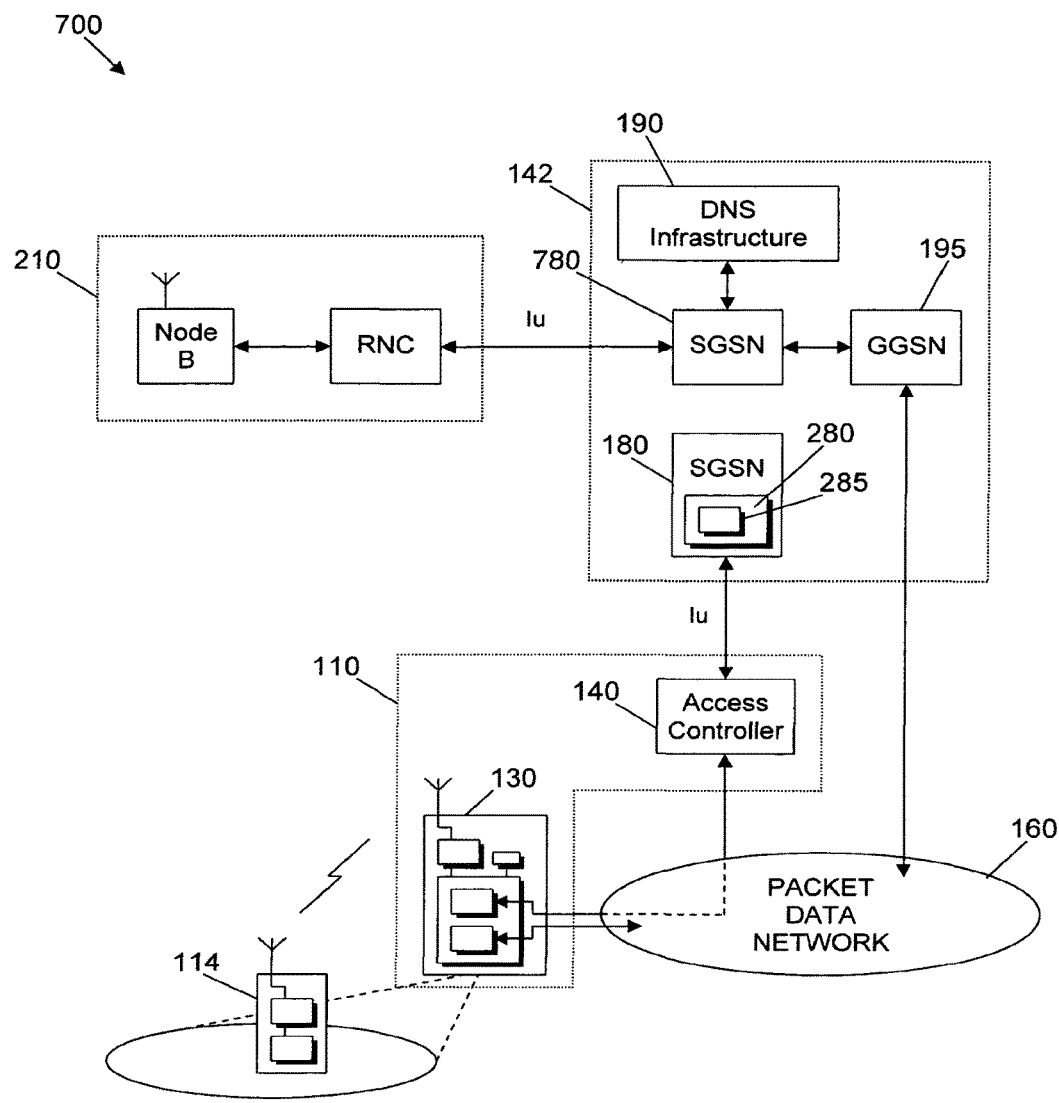
FIG. 7 illustrates an example of part of the cellular communication network of FIGS. 1 and 2 adapted in accordance with an alternative embodiment of the invention.

Referring now to FIG. 7, there is illustrated an example of part of the 3GPP network 700, adapted in accordance with a further alternative embodiment of the invention. In particular, there is illustrated an example of part of a cellular communication network 700 that comprises a combination of macro cells and femto cells. In the same manner as for the embodiment illustrated in FIG. 5, the femto cell scenario RNS 110 comprises a 3G AP 130 coupled to 3G access controller 140 via packet data network 160. The 3G access controller 140 is coupled to SGSN 180 within the core network 142 via an Iu interface, as shown. For the embodiment illustrated in FIG. 7, the SGSN 180 is operably coupled exclusively to femto sub-systems, such as the femto RNS 110 illustrated. Accordingly, SGSN 180 in FIG. 7 will hereinafter be referred to as femto SGSN 180.

The core network 142 is further coupled to a macro radio network sub-system 210 comprising one or more Radio Network Controllers (RNCs) 220 and one or more macro cell base station transceivers, or Node Bs in 3G parlance, 230. The one or more RNCs 220 within the macro radio network sub-system 210 are coupled to macro SGSN 780 via an Iu interface. The core network 142 further comprises DNS infrastructure 190 and GGSN 195, both of which are operably coupled to macro SGSN 780.

In accordance with an embodiment of the invention, the femto SGSN 180 comprises a signal processing logic module 280 arranged to receive requests to access the packet data network 160 from wireless communication units, and to initiate access creation in response thereto. In particular, the signal processing logic module 280 comprises gateway router logic 285, and upon receipt of a request to access a packet data network from a wireless communication within a femto cell, such as UE 114, the gateway router logic module 285 is arranged to identify a femto access point supporting the femto cell within which the wireless communication unit is located, and to obtain an address for a gateway interface of the identified femto access point with which the signal processing logic module 280 is to initiate access activation.

As previously mentioned, femto SGSN 180 is operably coupled exclusively to femto sub-systems. Accordingly, upon receipt of requests to access data packet network 160, there is no need for the signal processing logic module 280 to determine whether the request was received from a femto access controller. Similarly, the macro SGSN 780 may be operably coupled exclusively to macro sub-systems. As a result, the macro SGSN 780 may be implemented using traditional SGSN functionality.

For the embodiments illustrated in the accompanying drawings, and hereinbefore described, the femto gateway router logic module 185, 285 has been illustrated and described as forming a part of an SGSN. However, it is within the contemplation of the invention that the femto gateway router logic module 185, 285 may comprise a substantially separate network element to the SGSN. In particular, it is contemplated that such a gateway router logic module 185, 285 may be located between an SGSN and multiple GGSNs and multiple gateway logic modules. Thus, since conventional SGSNs are not typically designed to handle large numbers of GGSNs, and typically expect to interact with just a handful of GGSNs, the gateway router logic module 185, 285 is able to handle the communication with large numbers of gateway logic modules.

Furthermore, it is contemplated that for some embodiments of the invention, the femto gateway router logic module 185, 285 may appear to the SGSN as a standard GGSN. In this manner, the SGSN need not be modified from standard SGSN functionality in order to implement the features of the present invention. The femto gateway router logic module 185, 285 may also appear to a GGSN as a standard SGSN. In this manner, the GGSN need not be modified from standard GGSN functionality in order to implement the features of the present invention.

It is envisaged that the aforementioned embodiments aim to provide one or more of the following advantages:

(i) enabling external packet data networks to be accessed more efficiently via femto cells within a cellular communication network than is traditionally possible. In one embodiment, this accessing may be performed substantially without affecting the facility for accessing external packet data networks via macro cells;

(ii) enabling substantially direct access to packet data networks via femto access points, without the need for such access to be routed through a core network, thereby reducing unnecessary use of network resources employed in current architectures;

(iii) enabling the provision of access to an external packet data network whilst adhering to 3GPP (and/or other) standards, and without resources within the core network being unnecessarily reserved; and (iv) enabling the provision of substantially direct access to local packet data networks, such as Local Area Networks, corporate intranets, etc.

Figure 8:
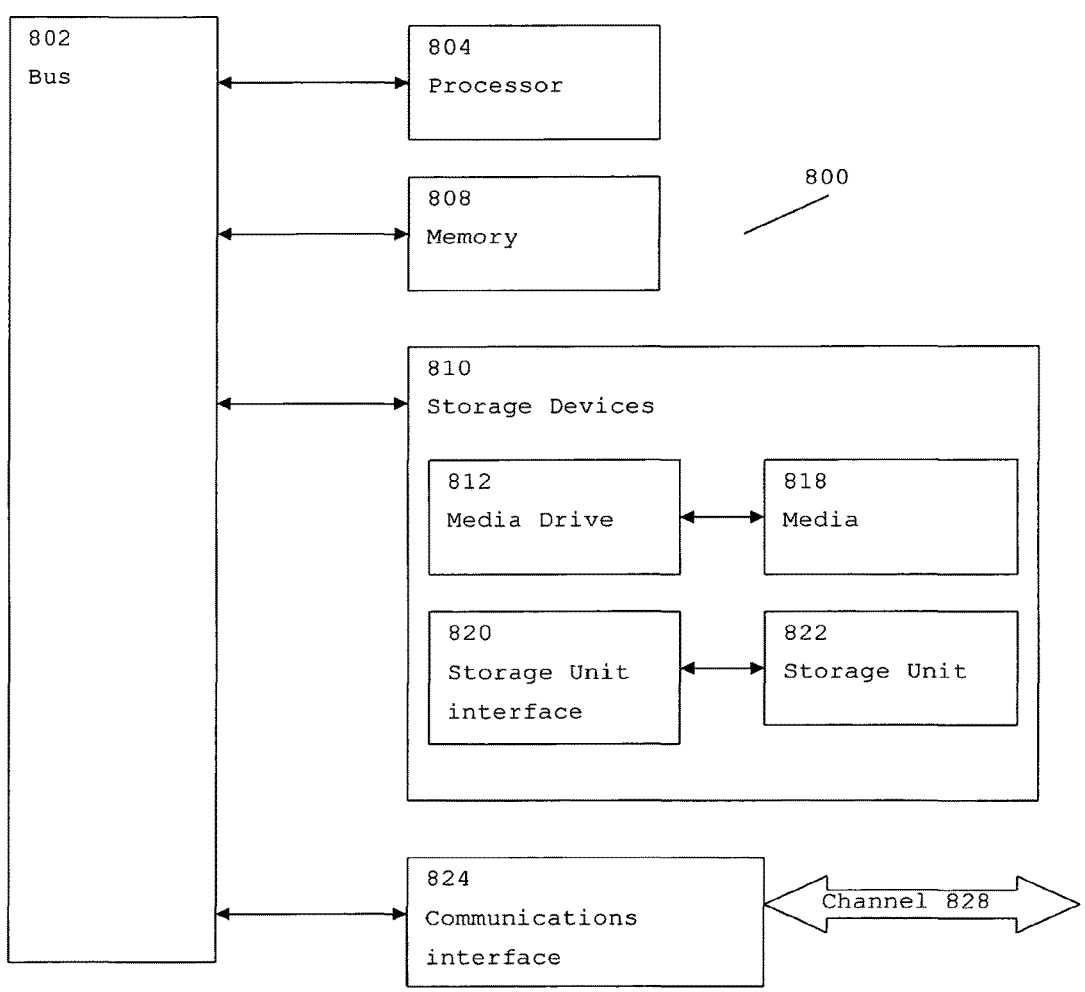
FIG. 8 illustrates a typical computing system that may be employed to implement signal processing functionality in embodiments of the invention.

Referring now to FIG. 8, there is illustrated a typical computing system 800 that may be employed to implement signal processing functionality in embodiments of the invention. Computing systems of this type may be used in access points and wireless communication units. Those skilled in the relevant art will also recognize how to implement the invention using other computer systems or architectures. Computing system 800 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 800 can include one or more processors, such as a processor 804. Processor 804 can be implemented using a general or special-purpose processing engine such as, for example, a microprocessor, microcontroller or other control logic. In this example, processor 804 is connected to a bus 802 or other communications medium.

Computing system 800 can also include a main memory 808, such as random access memory (RAM) or other dynamic memory, for storing information and instructions to be executed by processor 804. Main memory 808 also may be used for storing temporary variables or other intermediate information during execution of instructions to be executed by processor 804. Computing system 800 may likewise include a read only memory (ROM) or other static storage device coupled to bus 802 for storing static information and instructions for processor 804.

The computing system 800 may also include information storage system 810, which may include, for example, a media drive 812 and a removable storage interface 820. The media drive 812 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 818 may include, for example, a hard disk, floppy disk, magnetic tape, optical disk, CD or DVD, or other fixed or removable medium that is read by and written to by media drive 812. As these examples illustrate, the storage media 818 may include a computer-readable storage medium having particular computer software or data stored therein.

In alternative embodiments, information storage system 810 may include other similar components for allowing computer programs or other instructions or data to be loaded into computing system 800. Such components may include, for example, a removable storage unit 822 and an interface 820, such as a program cartridge and cartridge interface, a removable memory (for example, a flash memory or other removable memory module) and memory slot, and other removable storage units 822 and interfaces 820 that allow software and data to be transferred from the removable storage unit 822 to computing system 800.

Computing system 800 can also include a communications interface 824. Communications interface 824 can be used to allow software and data to be transferred between computing system 800 and external devices. Examples of communications interface 824 can include a modem, a network interface (such as an Ethernet or other NIC card), a communications port (such as for example, a universal serial bus (USB) port), a PCMCIA slot and card, etc. Software and data transferred via communications interface 824 are in the form of signals which can be electronic, electromagnetic, and optical or other signals capable of being received by communications interface 824. These signals are provided to communications interface 824 via a channel 828. This channel 828 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 808, storage device 818, or storage unit 822. These and other forms of computer-readable media may store one or more instructions for use by processor 804, to cause the processor to perform specified operations. Such instructions, generally referred to as 'computer program code' (which may be grouped in the form of computer programs or other groupings), when executed, enable the computing system 800 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 800 using, for example, removable storage unit 822, drive 812 or communications interface 824. The control logic (in this example, software instructions or computer program code), when executed by the processor 804, causes the processor 804 to perform the functions of the invention as described herein. It will be appreciated that, for clarity purposes, the above description has described embodiments of the invention with reference to different functional elements and processors. However, it will be apparent that any suitable distribution of functionality between different functional elements or processors, for example with respect to a base station or controller, may be used without detracting from the invention. For example, it is envisaged that functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units. Although one embodiment of the invention describes an AP for a UMTS network, it is envisaged that the inventive concept is not restricted to this embodiment.

Although the invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Moreover, an embodiment can be implemented as a computer-readable storage element having computer readable code stored thereon for programming a computer (e.g., comprising a signal processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second' etc. do not preclude a plurality.

Thus, a method and apparatus for providing access to a packet data network have been described, which aims to substantially address at least some of the shortcomings of past and present techniques and/or mechanisms for providing access to a packet data network.

We claim:

1. A network element of a cellular communication network, the network element comprising:
    signal processing logic comprising a gateway router that is coupled to respective local gateway interfaces of a plurality of base stations, wherein the signal processing logic is arranged to receive requests to access a packet data network (PDN) from wireless communication units and to initiate access activation in response thereto;
    wherein the signal processing logic receives a request to access a PDN that is identified by a generic address corresponding to gateway interfaces of the plurality of base stations from a wireless communication unit within a communication cell, and the gateway router is arranged to:
    identify, from the plurality of base stations identified by the generic address, a base station supporting communications in the communication cell within which the wireless communication unit is located; and
    obtain an address for a gateway interface of the identified base station with which the signal processing logic is to initiate access activation of the wireless communication unit to a local PDN coupled to the identified base station;
    wherein the obtained gateway interface address of the identified base station is subsequently used as a gateway in routing communications between the wireless communication unit and the local PDN.

2. The network element of claim 1 wherein, upon receipt of the request to access the packet data network, the signal processing logic is arranged to determine whether the request was received from a macro sub-system radio network controller or a femto access point.

3. The network element of claim 1 wherein the signal processing logic is arranged to receive an Activate PDP (Packet Data Protocol) Context Request message from the wireless communication unit and determine whether the received Activate PDP Context Request message comprises an Access Point Name (APN) that corresponds to a service relating to the data packet network with which the gateway router of the identified base station is arranged to provide the interface.

4. The network element of claim 3 wherein the signal processing logic is arranged to:
    compare the APN within the received request to a list of APN labels stored within memory: and
    in response to determining that the APN within the received request matches an APN on the list of APN labels stored within memory, the signal processing logic uses the APN.

5. The network element of claim 1 wherein the signal processor is configured to send the identified base station a tunnel endpoint identifier (TEID) and a user plane address so that user data carried by the identified tunnel is routed by the base station to the local gateway interface.

6. The network element of claim 1 wherein the communication cell is a femto cell and the base station is a femto access point.

7. The network element of claim 1 wherein the gateway router is arranged to provide an interface between the wireless communication unit located within the communication cell and at least one from a group of packet data networks consisting of: Internet or a Local Area Network (LAN).

8. The network element of claim 1 wherein the base station is a femto access point.

9. A method for providing access to a packet data network, the method comprising, at a network element:
receiving a request to access the packet data network (PDN) that is identified by a generic address corresponding to gateway interfaces of a plurality of base stations from a wireless communication unit within a communication cell;
identifying, from the plurality of base stations identified by the generic address, a base station that supports communications in the communication cell within which the wireless communication unit is located;
obtaining an address for a gateway interface of the identified base station; and
initiating access activation of the wireless communication unit to a local PDN coupled to the identified base station; wherein the obtained gateway interface address of the identified base station is subsequently used as a gateway in routing communications between the wireless communication unit and the local PDN.

10. The method of claim 9 further comprising:
determining whether the request was received from a macro sub-system radio network controller or a femto access point; and, in response to the request being received from the femto access point, the method further comprises:
providing the request to the gateway router, and
obtaining an appropriate address for the gateway interface of the femto access point by the gateway router.

11. A network element of a cellular communication network, the network element comprising:
signal processing logic circuit comprising a gateway router that is coupled to respective local gateway interfaces of a plurality of base stations, wherein the signal processing logic circuit is arranged to receive requests to access a packet data network (PDN) from wireless communication units and to initiate access activation in response thereto;
wherein the signal processing logic circuit receives a request to access a PDN that is identified by a generic address corresponding to gateway interfaces of the plurality of base stations from a wireless communication unit within a communication cell, the gateway router is arranged to:
identify, from the plurality of base stations identified by the generic address, a base station supporting communications in the communication cell within which the wireless communication unit is located; and
obtain an address for a gateway interface of the identified base station with which the signal processing logic circuit is to initiate access activation of the wireless communication unit to a local PDN coupled to the identified base station;
wherein the obtained gateway interface address of the identified base station is subsequently used as a gateway in routing communications between the wireless communication unit and the local PDN.

12. The network element of claim 11 wherein, upon receipt of the request to access the packet data network, the signal processing logic circuit is arranged to determine whether the request was received from a macro sub-system radio network controller or a femto access point.

13. The network element of claim 11 wherein the signal processing logic circuit is arranged to receive an Activate PDP (Packet Data Protocol) Context Request message from the wireless communication unit and determine whether the received Activate PDP Context Request message comprises an Access Point Name (APN) that corresponds to a service relating to the data packet network with which the gateway router of the identified base station is arranged to provide the interface.

14. The network element of claim 13 wherein the signal processing logic circuit is arranged to:
compare the APN within the received request to a list of APN labels stored within memory; and
in response to determining that the APN within the received request matches an APN on the list of APN labels stored within memory, the signal processing logic uses the APN.

15. The network element of claim 11 wherein the signal processor is configured to send the identified base station a tunnel endpoint identifier (TEID) and a user plane address so that user data carried by the identified tunnel is routed by the base station to the local gateway interface.

16. The network element of claim 11 wherein the gateway router is arranged to provide an interface between the wireless communication unit located within the communication cell and at least one from a group of packet data networks consisting of: Internet or a Local Area Network (LAN).

* * * * *